(12) United States Patent
Takenaka et al.

(10) Patent No.: US 9,302,730 B2
(45) Date of Patent: Apr. 5, 2016

(54) MOBILE VEHICLE

(71) Applicant: HONDA MOTOR CO., LTD., Tokyo (JP)

(72) Inventors: Toru Takenaka, Wako (JP); Hiroshi Gomi, Wako (JP); Hiroyuki Makino, Wako (JP); Kazushi Akimoto, Wako (JP); Naoyuki Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 14/220,686

(22) Filed: Mar. 20, 2014

(65) Prior Publication Data

US 2014/0284899 A1    Sep. 25, 2014

(30) Foreign Application Priority Data

Mar. 25, 2013  (JP) .................................. 2013-062721

(51) Int. Cl.
*B62K 21/00* (2006.01)
*B62K 21/22* (2006.01)
*B62K 21/12* (2006.01)

(52) U.S. Cl.
CPC .................. *B62K 21/12* (2013.01); *B62K 21/00* (2013.01); *B62K 21/22* (2013.01)

(58) Field of Classification Search
CPC ........ B62K 21/00; B62K 21/02; B62K 21/04; B62K 21/12; B62K 21/18; B62K 21/22; B62J 99/00
USPC .................. 280/276, 279, 270, 271
See application file for complete search history.

(56) References Cited

U.S. PATENT DOCUMENTS

| 1,175,744 | A | * | 3/1916 | Giles | ...................... | B62K 21/00 |
| | | | | | | 280/270 |
| 4,383,388 | A | * | 5/1983 | Suimon | .................. | A63H 17/21 |
| | | | | | | 280/279 |
| 4,600,207 | A | * | 7/1986 | Zosi | ....................... | B62K 11/04 |
| | | | | | | 280/276 |
| 4,807,898 | A | * | 2/1989 | Huntly | ................... | B62K 25/24 |
| | | | | | | 280/276 |
| 4,834,412 | A | * | 5/1989 | Trema | .................... | B62K 21/02 |
| | | | | | | 280/276 |
| 6,095,891 | A | * | 8/2000 | Hoeting | ................. | A63H 17/22 |
| | | | | | | 446/431 |
| 6,786,796 | B2 | * | 9/2004 | Suto | ....................... | A63H 17/16 |
| | | | | | | 446/440 |
| 7,438,306 | B2 | * | 10/2008 | Mrdeza | ................. | B62K 21/04 |
| | | | | | | 280/274 |

FOREIGN PATENT DOCUMENTS

JP         2011-046342         3/2011

* cited by examiner

*Primary Examiner* — Anne Marie Boehler
(74) *Attorney, Agent, or Firm* — Rankin, Hill & Clark LLP

(57) ABSTRACT

A two-wheeled vehicle 1 includes a steering section 6 which steers a front wheel 4. The steering section includes a steering shaft link 13 which turns about a first steering axis 10 together with a second steering axis 11, a front-wheel support section 14 which turns the front wheel 4 about the second steering axis 11, and a first motor 15 which causes the steering shaft link 13 to turn. A caster angle θ based on the first steering axis 10 is positive or 0. A trail t1 based on the second steering axis 11 is positive. When the two-wheeled vehicle 1 is in a basic posture state on a ground surface 12, the intersection point P3 of the second steering axis 11 and the ground surface 12 lies in front of the intersection point P2 of the first steering axis 10 and the ground surface 12.

14 Claims, 12 Drawing Sheets

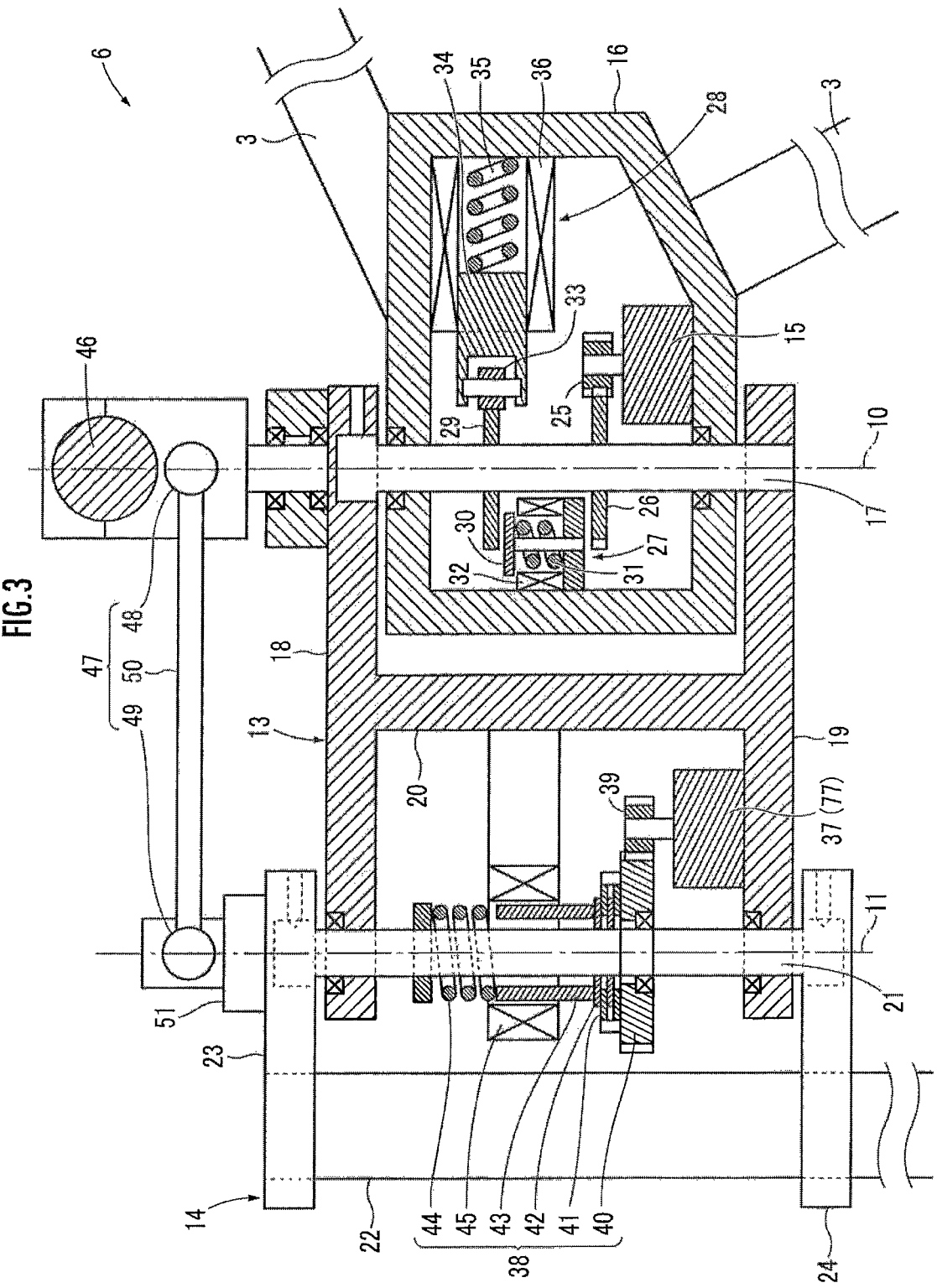

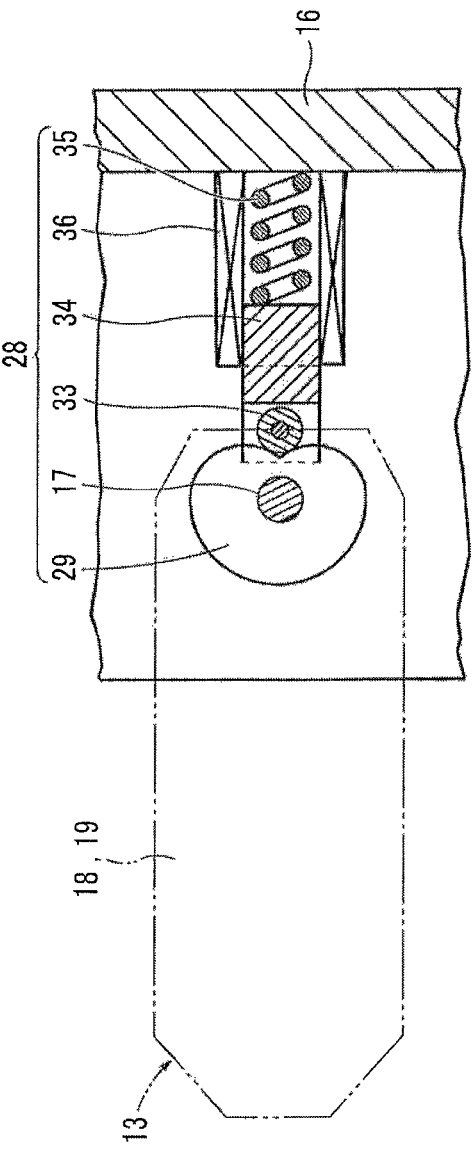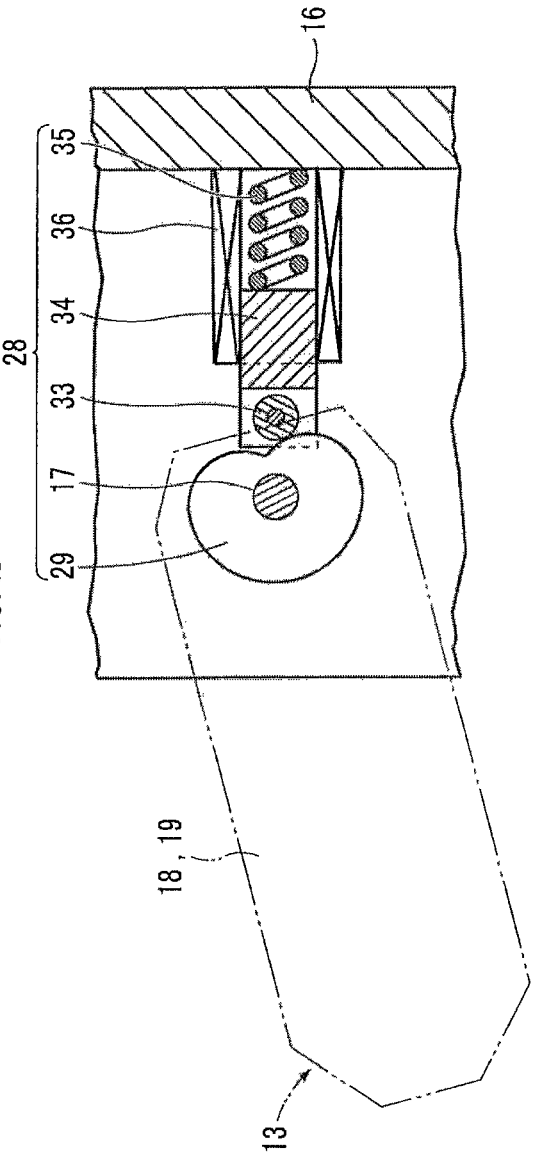

MOBILE VEHICLE

BACKGROUND OF THE INVENTION

1. Field of the Invention

The present invention relates to a mobile vehicle (mobile object) having a front wheel and a rear wheel, with the front wheel being steered.

2. Description of the Related Art

As such a mobile vehicle, a motorcycle which includes a steering ratio varying means that uses a first motor to arbitrarily change the ratio of the turn angle of a handlebar manipulated by a rider to the steer angle of the front wheel, and a steering power assist means that adds auxiliary force by a second motor to the manipulation force input to the handlebar is conventionally known, as seen, for example, in Japanese Patent Application Laid-Open No. 2011-046342 (hereinafter, referred to as "Patent Literature 1").

In the motorcycle described in Patent Literature 1, the second motor is driven on the basis of various sensor information including the steering torque, vehicle speed, engine speed, and the number of gear stages of the motorcycle, the roll, pitch, and yaw angles of the vehicle body, steered angle, and steering ratio, to assist the steering force of the front wheel. That is, control is performed to reduce the handlebar manipulation force during stopping of the motorcycle, to set the steering torque during traveling thereof, and so on.

Further, the first motor is driven on the basis of the above-described sensor information to set the steering ratio. That is, control can be performed such that the steering angle of the front wheel with respect to the handlebar manipulated variable decreases as the vehicle speed increases, and that the steering angle with respect to the handlebar manipulated variable becomes large when the rider keeps his/her balance by manipulating the handlebar while traveling at very low speeds.

SUMMARY OF THE INVENTION

In the motorcycle of Patent Literature 1 described above, however, the steering ratio is changed by the steering ratio varying means responsive to the traveling speed. Therefore, for the rider to keep his/her balance at low speeds, the rider needs to manipulate the handlebar by adapting to the change characteristics of the steering ratio.

In view of the foregoing problems in the conventional art, it is an object of the present invention to provide a mobile vehicle which can readily secure the stability of the posture during stopping or traveling at low speeds, without the need for a rider to manipulate the handlebar by adapting to the change characteristics of the steering ratio.

A mobile vehicle according to a first aspect of the invention is a mobile vehicle which includes a vehicle body having a seat, a front wheel and a rear wheel arranged spaced apart from each other in a longitudinal direction of the vehicle body, and a steering section configured to cause the front wheel to turn about a steering axis, wherein the steering axis includes a first steering axis and a second steering axis, the first steering axis is arranged at a front of the vehicle body, and the steering section includes: a steering shaft link which is provided to be turnable about the first steering axis and which has the second steering axis arranged therein; a front-wheel support section which is provided to be turnable about the second steering axis and which supports the front wheel; a first actuator which causes the steering shaft link to turn about the first steering axis relative to the vehicle body; a posture detector which detects a posture state in a roll direction of the vehicle body; and a control section which controls the first actuator on the basis of the detection result by the posture detector, and wherein a caster angle based on the first steering axis is positive or 0, a trail based on the second steering axis is positive, and when the mobile vehicle is in a basic posture state on a flat ground surface, a point of intersection of the second steering axis and the ground surface lies in front of a point of intersection of the first steering axis and the ground surface.

Here, the "basic posture state" means the state in which the mobile vehicle is stationary in a straight-ahead posture on the ground surface. In this state, the steering angle about the first steering axis and the steering angle about the second steering axis are both zero, and the steering angle is in the neutral position. The "caster angle based on (a) steering axis" means the angle formed by the steering axis and a vertical line. The caster angle takes a positive value when the steering axis is tilted backward, and it takes a negative value when the steering axis is tilted forward.

Further, the "trail based on (a) steering axis" means a distance from the point of intersection of a vertical line passing through the center of rotation of the front wheel and the ground surface to the point of intersection of the steering axis and the ground surface. The trail takes a positive value when the point of intersection of the steering axis and the ground surface lies in front of the point of intersection of the vertical line and the ground surface, and it takes a negative value when the former lies behind the latter.

In the first aspect of the invention, the caster angle based on the first steering axis is positive or 0, the trail based on the second steering axis is positive, and the point of intersection of the second steering axis and the ground surface lies in front of the point of intersection of the first steering axis and the ground surface. Therefore, the trail based on the first steering axis is smaller than the trail based on the second steering axis.

Further, according to the studies conducted by the present inventors, it has been found that in the case of applying, to the vehicle body, restoring force of the posture in the roll direction by way of steering of the front wheel, the trail based on the steering axis should be smaller than a prescribed value. When the trail is smaller, for example in the case where the trail is zero or negative, the restoring force can be applied efficiently with a smaller steering angle.

The prescribed value described above is a value which is determined in accordance with, for example, the height of the center of gravity of the mobile vehicle, the vehicle's mass, the inertia moment about an axis which extends in the longitudinal direction while passing through the center of gravity, the horizontal distances from the center of gravity to the front wheel and the rear wheel, and the radii of curvature of the cross sections of the front wheel and the rear wheel.

Therefore, for example in the case where the mobile vehicle is in a low-speed state or a stopped state, when the control section causes the first actuator to make the steering shaft link turn about the first steering axis having a small trail on the basis of the posture state in the roll direction of the vehicle body, appropriate restoring force (moment in the roll direction) can be applied to the vehicle body. This enables the control section to readily perform self-sustaining control of stabilizing the posture of the vehicle body during stopping of the vehicle or during low-speed traveling in which the vehicle travels at a speed below a prescribed level.

On the other hand, in the case of normal traveling in which the vehicle travels at a speed of the prescribed level or higher, the steering shaft link is locked in a neutral position (where the steering angle about the first steering axis is zero) and the turning of the steering shaft link is stopped, so that the front wheel can be led with a large (positive) trail of the second steering axis, thereby enabling the mobile vehicle to travel with good straight traveling property and good maneuverability which are achieved by the self-steering function. That is, in each of the self-sustaining control and the normal traveling, the steering can be performed based on the steering axis the trail of which is suitable for that situation.

A second aspect of the invention is characterized in that, in the first aspect of the invention, the control section causes the first actuator to make the steering shaft link turn about the first steering axis having a trail smaller than the trail of the second steering axis, on the basis of the posture state in the roll direction of the vehicle body, to thereby carry out self-sustaining control of stabilizing the posture of the vehicle body by applying restoring force to the vehicle body.

According to the second aspect of the invention, the control section of the mobile vehicle carries out the self-sustaining control of stabilizing the posture of the vehicle body by applying the restoring force to the vehicle body. This allows the rider of the mobile vehicle to readily secure the stability of the posture of the vehicle body while stopping or traveling at low speeds.

A third aspect of the invention is characterized in that, in the first or second aspect of the invention, the steering section further includes a second actuator which causes the front-wheel support section to turn about the second steering axis relative to the steering shaft link.

According to the third aspect of the invention, in the self-sustaining control, the second actuator can be controlled in cooperation with the first actuator to thereby obtain more effective restoring force. This cooperation is preferably performed when the steered angle about the first steering axis is large. That is, when the steering shaft link is turned to a large extent from the neutral position, the front-wheel support section is also made to turn in the same direction, so that larger restoring force can be obtained. This enables the self-sustaining control to be performed with higher stability.

A fourth aspect of the invention is characterized in that, in the first or second aspect of the invention, the steering section further includes a braking force generating section which generates braking force for suppressing the turning of the front-wheel support section about the second steering axis relative to the steering shaft link.

According to the fourth aspect of the invention, when the steering shaft link is made to turn about the first steering axis, the braking force generating section can reduce the angular velocity of the front-wheel support section about the second steering axis, to suppress the turning of the front-wheel support section in the direction opposite to the turning direction of the steering shaft link. This can suppress the decrease of the restoring force due to the front-wheel support section turning in the direction opposite to that of the steering shaft link.

A fifth aspect of the invention is characterized in that, in the first or second aspect of the invention, the steering section further includes a lock mechanism which switches between a locked state in which the front-wheel support section is locked to the steering shaft link and an unlocked state in which the locked state is released.

According to the fifth aspect of the invention, when the steering shaft link is made to turn about the first steering axis, the lock mechanism can lock the front-wheel support section to the steering shaft link, to prevent the front-wheel support section from turning in the direction opposite to the turning direction of the steering shaft link. Accordingly, it is possible to prevent the decrease of the restoring force due to the front-wheel support section turning in the direction opposite to that of the steering shaft link.

A sixth aspect of the invention is characterized in that, in the third aspect of the invention, the steering section further includes a clutch mechanism which switches between a transmission-enabled state in which driving force of the second actuator is transmitted to the front-wheel support section and a transmission-interrupted state in which the transmission is interrupted.

According to the sixth aspect of the invention, the clutch mechanism is set to the transmission-enabled state in the self-sustaining control, and set to the transmission-interrupted state during normal traveling. Therefore, the turning of the front-wheel support section by the second actuator is enabled in the self-sustaining control. On the other hand, during normal traveling, the turning of the front-wheel support section by the steering by the rider can be prevented from being hindered by the friction of the second actuator. Accordingly, during the normal traveling, it is possible to make the self-steering function work effectively, while ensuring good maneuvering feeling.

A seventh aspect of the invention is characterized in that, in any of the first through sixth aspects of the invention, the steering section further includes a first lock mechanism which switches between a locked state in which the steering shaft link is locked to the vehicle body and an unlocked state in which the locking is released.

According to the seventh aspect of the invention, the first lock mechanism can be used to lock the steering shaft link to the vehicle body during normal traveling with no self-sustaining control. This ensures more reliable locking without rattling, compared to the case of using the first actuator for the locking.

An eighth aspect of the invention is characterized in that, in any of the first through seventh aspects of the invention, the steering section further includes a second lock mechanism which switches between a locked state in which the steering shaft link is locked to the vehicle body while the link is in a neutral position and an unlocked state in which the locking is released.

According to the eighth aspect of the invention, the second lock mechanism can lock the steering shaft link in its neutral position. The stiffness about the first steering axis obtained when locking the steering shaft link with the second lock mechanism becomes greater than the stiffness obtained by the torque upon driving of the first actuator. Accordingly, the steering shaft link can be reliably locked in the neutral position by the second lock mechanism.

A ninth aspect of the invention is characterized in that, in any of the first through eighth aspects of the invention, the steering section further includes a biasing section which urges the steering shaft link toward a neutral position thereof.

According to the ninth aspect of the invention, it is possible to make the steering shaft link turn toward the neutral position without the need of the control of the first actuator.

A tenth aspect of the invention is characterized in that, in any of the first through ninth aspects of the invention, the first steering axis and the second steering axis are parallel to each other.

According to the tenth aspect of the invention, it is possible to prevent the direction of the second steering axis from being changed when the steering shaft link is turned about the first steering axis. Formation of the steering shaft link and the like also becomes easy.

An eleventh aspect of the invention is characterized in that, in any of the first through tenth aspects of the invention, the steering section further includes a handlebar which is provided to be turnable about a rotational axis whose position with respect to the vehicle body is fixed, and a handlebar transmission mechanism which links the handlebar to the front-wheel support section so as to control the steered angle of the front wheel by manipulation of the handlebar.

According to the eleventh aspect of the invention, the handlebar and the front-wheel support section are linked by the handlebar transmission mechanism such as a link mechanism. This makes it possible to arrange the turning shaft of the handlebar in an arbitrary position when designing the handlebar transmission mechanism.

A twelfth aspect of the invention is characterized in that, in the eleventh aspect of the invention, the handlebar transmission mechanism includes a first lever which turns about the rotational axis of the handlebar in an integrated manner with the handlebar, a second lever which turns about the second steering axis and applies rotative force to the front-wheel support section, and a first link which connects the first lever with the second lever, wherein the rotational axis of the handlebar is collinear with the first steering axis.

According to the twelfth aspect of the invention, it is possible to form the handlebar transmission mechanism most easily while making the rotational axis of the handlebar agree with the first steering axis.

A thirteenth aspect of the invention is characterized in that, in the eleventh aspect of the invention, the handlebar transmission mechanism includes a third lever which turns in an integrated manner with the handlebar, a fourth lever which is turnably supported by the vehicle body or the steering shaft link, a fifth lever which turns about the second steering axis in an integrated manner with the front-wheel support section, a third link which connects the third lever with the fourth lever, and a fourth link which connects the fourth lever with the fifth lever, wherein the fourth lever has a rotational axis collinear with the first steering axis.

According to the thirteenth aspect of the invention, it is possible to steer, with the handlebar, the front wheel held by the front-wheel support section which is turned about the second steering axis relative to the vehicle body, while positioning the rotational axis of the handlebar near the second steering axis. Further, when the third and fourth levers are set in parallel and the fifth and fourth levers are set in parallel, the handlebar angle of the handlebar and the steering angle of the front wheel can be made to agree with each other.

A fourteenth aspect of the invention is characterized in that, in the eleventh aspect of the invention, the handlebar transmission mechanism includes a third lever which turns in an integrated manner with the handlebar, a fourth lever which is turnably supported by the vehicle body or the steering shaft link, a fifth lever which turns about the second steering axis in an integrated manner with the front-wheel support section, a third link which connects the third lever with the fourth lever, and a fourth link which connects the fourth lever with the fifth lever, wherein the fourth lever has a rotational axis arranged in parallel with the first steering axis, at a prescribed distance from the first steering axis.

According to the fourteenth aspect of the invention, selecting a distance from the first steering axis to the handlebar rotational axis makes it possible to set the amount of change in handlebar angle to the amount of change in turning angle of the steering shaft link about the first steering axis.

BRIEF DESCRIPTION OF THE DRAWINGS

FIG. 3 is a partial cross-sectional view taken along the line III-III in FIG. 2;
FIGS. 4A and 4B illustrate the second lock mechanism in the two-wheeled vehicle in FIG. 1.

DESCRIPTION OF THE PREFERRED EMBODIMENTS

Figure 1:
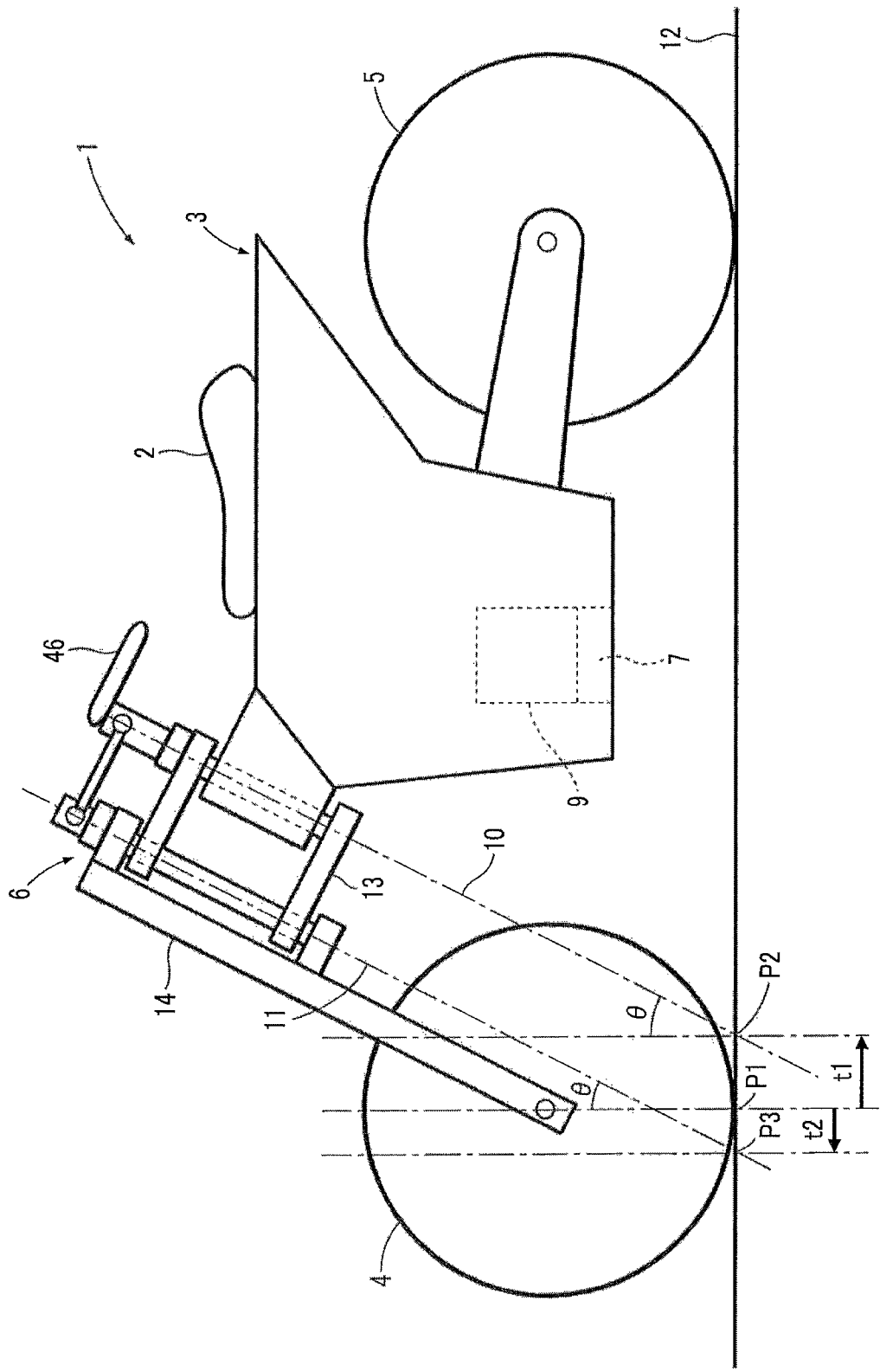
FIG. 1 is a side view of a two-wheeled vehicle according to an embodiment of the present invention.

An embodiment of the present invention will be described below by referring to the drawings. As shown in FIG. 1, a two-wheeled vehicle 1 according to an embodiment of the present invention includes: a vehicle body 3 having a seat 2, a front wheel 4 and a rear wheel 5 arranged spaced apart from each other in the longitudinal direction of the vehicle body 3, a steering section 6 for causing the front wheel 4 to turn about a steering axis, a posture detector 7 which detects, for example, a roll angle and a roll angular velocity of the vehicle body 3, and a control section 9 which controls a first motor 15, a second motor 37, and a third motor 51, described later, on the basis of the detection result by the posture detector 7.

In the following description, "front", "rear", "left", and "right" indicating the directions mean "front", "rear", "left", and "right", respectively, with reference to the two-wheeled vehicle 1.

A first steering axis 10 and a second steering axis 11 are provided as the steering axes. The first steering axis 10 is arranged at the front of the vehicle body 3. The second steering axis 11 is arranged in front of, and in parallel with, the first steering axis 10. The steering for causing the front wheel 4 to turn about the first steering axis 10 is carried out by the control section 9. The steering for causing the front wheel 4 to turn about the second steering axis 11 is carried out by the control section 9 or on the basis of the manipulation of a handlebar by the rider.

In FIG. 1, the two-wheeled vehicle 1 in a basic posture state is shown. The basic posture state means the state in which the vehicle is standing still in a straight-ahead posture on a flat ground surface 12. In this state, the steering angle about the first steering axis 10 and the steering angle about the second steering axis 11 are both zero, and the steering angle is in a neutral position.

Further, the rotary shaft of the front wheel 4 in the basic posture state is horizontal and orthogonal to the longitudinal direction of the vehicle body 3. That is, the roll angle of the vehicle body 3 is zero. Further, in this state, a handlebar 46, a steering shaft link 13, a front-wheel support section 14, etc. (described later) are each in a neutral position, with its turn angle being zero.

In the basic posture state, the angle formed by the first steering axis 10 and a vertical line is defined as a caster angle θ based on the first steering axis 10. The caster angle θ takes a positive value when the first steering axis 10 is tilted backward, and it takes a negative value when the first steering axis 10 is tilted forward. The distance from an intersection point P1 of the vertical line passing through the center of rotation of the front wheel 4 and the ground surface 12 (i.e. the center of the ground contact area of the front wheel 4) to an intersection point P2 of the first steering axis 10 and the ground surface 12 is defined as a trail t1 based on the first steering axis 10.

Further, the distance from the intersection point P1 of the vertical line passing through the center of rotation of the front wheel 4 and the ground surface 12 to an intersection point P3 of the second steering axis 11 and the ground surface 12 in the basic posture state is defined as a trail t2 based on the second steering axis 11. For each of the trails t1 and t2, the frontward distance with respect to the intersection point P1 of the vertical line passing through the center of rotation of the front wheel 4 and the ground surface 12 is defined as a positive trail, and the rearward distance with respect to the intersection point P1 is defined as a negative trail.

The caster angle θ based on the first steering axis 10 is positive. The trail t2 based on the second steering axis 11 is positive. The intersection point P3 of the second steering axis 11 and the ground surface 12 lies in front of the intersection point P2 of the first steering axis 10 and the ground surface 12. The trail t1 based on the first steering axis 10 is negative. The first steering axis 10 and the second steering axis 11 are parallel to each other. As the intersection point P2 is located behind the intersection point P3, the trail t1 based on the first steering axis 10 is smaller than the trail t2 based on the second steering axis 11.

It has been found through the studies conducted by the present inventors that the trail based on a steering axis needs to be smaller than a prescribed value in order to apply to the vehicle body 3 restoring force of the posture in the roll direction by way of steering of the front wheel 4. Further, when the trail is smaller, for example in the case where the trail is zero or negative, the restoring force can be applied efficiently with a smaller steering angle.

The prescribed value described above is a value which is determined in accordance with, for example, the height of the center of gravity of the two-wheeled vehicle 1, the vehicle's mass, the inertia moment about the axis which extends in the longitudinal direction while passing through the center of gravity, the horizontal distances from the center of gravity to the front wheel 4 and the rear wheel 5, and the radii of curvature of the cross sections of the front wheel 4 and the rear wheel 5.

Therefore, during low-speed traveling or stopping of the two-wheeled vehicle 1, when the steering of the front wheel 4 is performed based on the first steering axis 10 whose trail t1 is negative, control of stabilizing the posture of the vehicle body 3 (hereinafter, referred to as "self-sustaining control") can be carried out efficiently. In the self-sustaining control, at least the roll angle and the roll angular velocity of the vehicle body 3, detected by the posture detector 7, are referred to.

It should be noted that the caster angle θ based on the first steering axis 10 may be 0, and the first steering axis 10 and the second steering axis 11 do not necessarily have to be parallel to each other. The trail t1 based on the first steering axis 10 may take a positive value equal to or less than a prescribed value. In these cases as well, steering the front wheel 4 with reference to the first steering axis 10 ensures efficient self-sustaining control.

Figure 2:
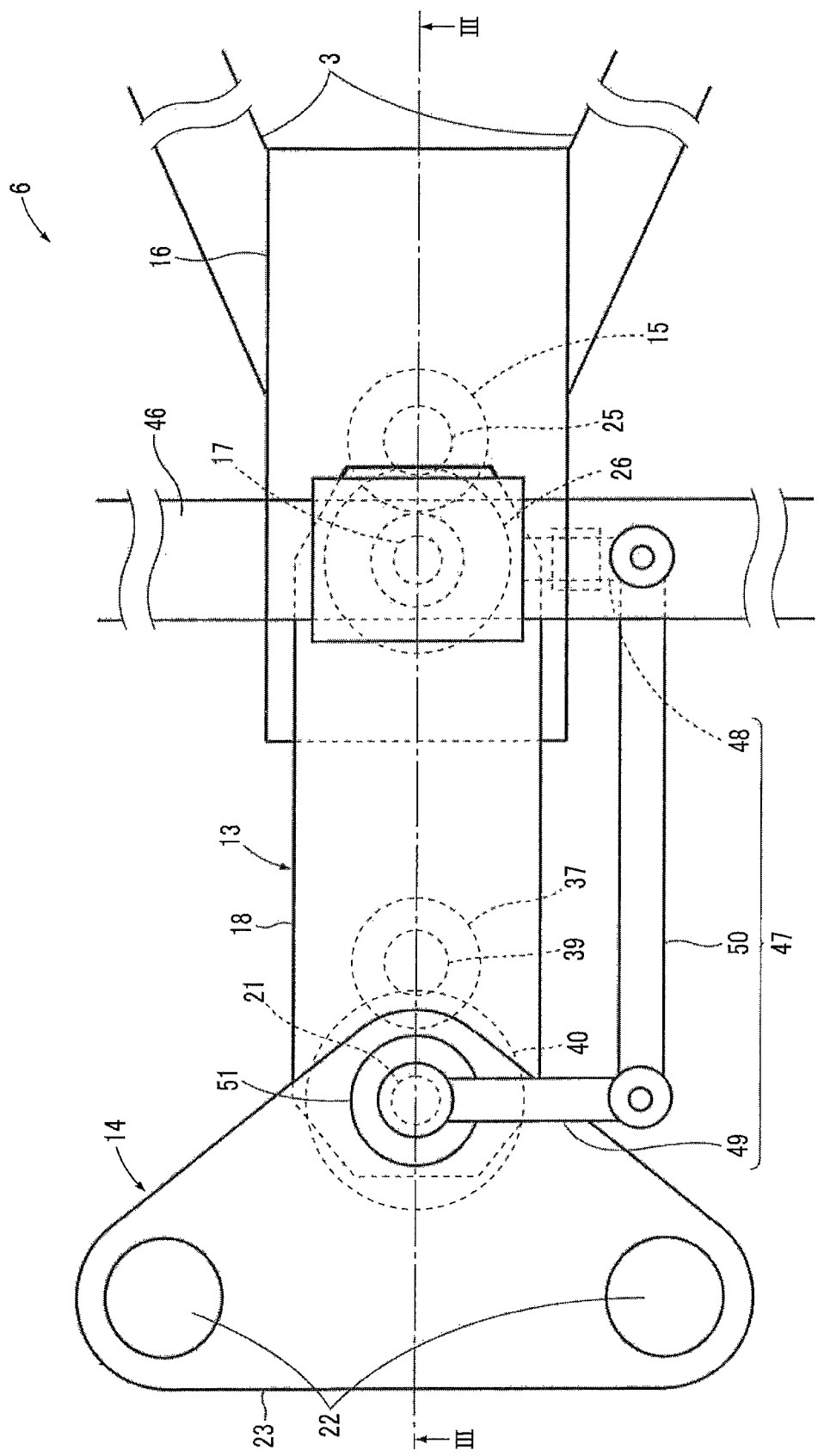
FIG. 2 is a plan view of a portion including the steering section of the two-wheeled vehicle in FIG. 1.

FIG. 2 is a plan view of a portion including the steering section 6 of the two-wheeled vehicle 1 in the basic posture state. FIG. 3 is a partial cross-sectional view taken along the line III-III in FIG. 2. As shown in FIGS. 2 and 3, the steering section 6 includes: a steering shaft link 13 which is provided to be turnable about the first steering axis 10 and which has the second steering axis 11 arranged therein, a front-wheel support section 14 which is provided to be turnable about the second steering axis 11 and which supports the front wheel 4, and a first motor 15 as a first actuator which causes the steering shaft link 13 to turn about the first steering axis 10 relative to the vehicle body 3.

The first steering axis 10 is configured as a center axis of a first steering shaft 17 which is supported by a housing 16 secured to the vehicle body 3. The first steering shaft 17 penetrates from an upper side to a lower side of the housing 16, through an inner space thereof. The first steering shaft 17 is turnably supported, via bearings or the like, at its portions penetrating the upper side and the lower side of the housing 16.

The steering shaft link 13 is configured with an upper plate 18 and a lower plate 19 which extend in the direction perpendicular to the first steering shaft 17, and a coupling plate 20 which couples the upper plate 18 with the lower plate 19. The upper plate 18, the lower plate 19, and the coupling plate 20 have their plate surfaces parallel to the lateral direction of the two-wheeled vehicle 1. The cross sections of the plates perpendicular to the lateral direction form an H shape, as shown in FIG. 3.

The upper plate 18 and the lower plate 19 have their rear end portions secured to the respective end portions of the first steering shaft 17 that project upward and downward from the housing 16. The front end portions of the upper plate 18 and the lower plate 19 support a second steering shaft 21 in a turnable manner via bearings or the like. The second steering axis 11 is configured as a center axis of the second steering shaft 21.

The front-wheel support section 14 includes a front fork 22 which supports the rotary shaft of the front wheel 4, and a top bridge 23 and a bottom bridge 24 having their front sides secured to the front fork 22. The second steering shaft 21 has its respective end portions projecting outward from the upper plate 18 and the lower plate 19 and secured to the rear sides of the top bridge 23 and the bottom bridge 24, respectively. With this configuration, the front wheel 4 is supported so as to be turnable about the second steering shaft 21, with an offset provided by the top bridge 23 and the bottom bridge 24.

The first motor 15 is arranged inside the housing 16. The driving force of the first motor 15 is transmitted to the first steering shaft 17 via a first pinion 25, which is secured to the driving shaft of the first motor 15, and a first gear 26, which is secured to the first steering shaft 17 inside the housing 16, to rotate the first steering shaft 17.

Further, a first lock mechanism 27 and a second lock mechanism 28 are provided inside the housing 16. The first lock mechanism 27 switches between a locked state, in which the steering shaft link 13 is locked to the vehicle body 3, and an unlocked state, in which the locking is released. The second lock mechanism 28 switches between a locked state, in which the steering shaft link 13 is locked in the neutral position to the vehicle body 3, and an unlocked state, in which the locking is released.

The first lock mechanism 27 includes: a cam/brake disc 29 which is secured perpendicularly to the first steering shaft 17, a locking brake pad 30 which is supported so as to be movable between an engaged position where it is engaged with the cam/brake disc 29 and a disengaged position where the engagement is released, a first coil spring 31 which urges the locking brake pad 30 toward the engaged position, and a first electromagnet 32 which pulls the locking brake pad 30 back to the disengaged position against the biasing force of the first coil spring 31.

When the first electromagnet 32 is not energized, the first lock mechanism 27 is in the locked state where the locking brake pad 30 is placed in the engaged position by the first coil spring 31. When the first electromagnet 32 is energized, the first lock mechanism 27 attains the unlocked state where the locking brake pad 30 is pulled back to the disengaged position against the biasing force of the first coil spring 31.

The second lock mechanism 28 includes: the cam/brake disc 29 described above, a roller 33 which rolls along the cam face of the cam/brake disc 29, a first iron core 34 which is guided in the direction orthogonal to the first steering shaft 17, a second coil spring 35 which urges the first iron core 34 in the direction in which the roller 33 pushes the cam face, and a second electromagnet 36 for attracting the first iron core 34 in the direction opposite to the biasing force applied by the second coil spring 35.

FIGS. 4A and 4B illustrate the operations of the second lock mechanism 28. In FIG. 4A, the two-dot chain line shows the upper plate 18 and the lower plate 19 in the state where the steering shaft link 13 is in the neutral position. FIG. 4B shows the state where the steering shaft link 13 has been turned from the neutral position.

As shown in FIGS. 4A and 4B, the cam/brake disc 29 comprises a heart-shaped plate cam. The second lock mechanism 28 is configured such that, when the steering shaft link 13 is in the neutral position, the roller 33 is positioned in the dent of the heart-shaped cam face of the cam/brake disc 29, as shown in FIG. 4A.

When the second electromagnet 36 is not energized, the roller 33 at the tip end of the first iron core 34 is pressed against the cam face of the cam/brake disc 29 by the biasing force of the second coil spring 35. As a result, the steering shaft link 13 is urged toward the neutral position and is maintained in the state where it is held in the neutral position.

In this state, when the steering shaft link 13 is turned as shown in FIG. 4B, the first iron core 34 is moved in the direction away from the first steering shaft 17 by the cam face of the cam/brake disc 29 via the roller 33. At this time, the second electromagnet 36 is energized for permitting the movement. With this energization, the first iron core 34 is attracted against the biasing force of the second coil spring 35. As a result, the biasing force for making the steering shaft link 13 return to the neutral position is reduced or cancelled.

For causing the steering shaft link 13 to return to the neutral position, the energization of the second electromagnet 36 is stopped. The biasing force of the second coil spring 35 is transmitted again to the cam face of the cam/brake disc 29. As a result, the steering shaft link 13 is urged toward the neutral position and is held in the neutral position.

Figure 5A:
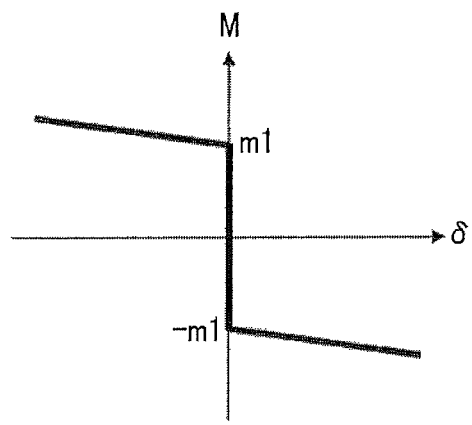
FIGS. 5A, 5B, and 5C illustrate the characteristics of the second lock mechanism shown in FIGS. 4A and 4B.
Figure 5B:
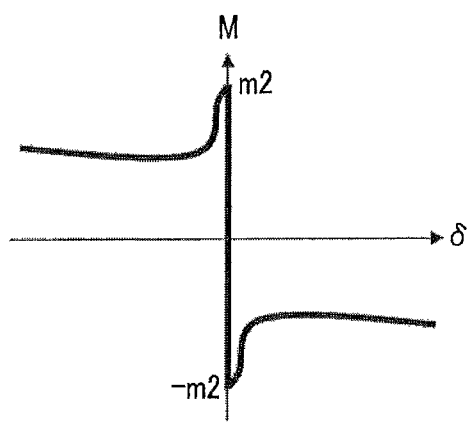
Figure 5C:
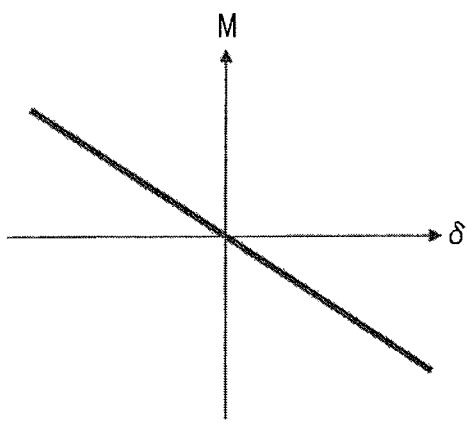

FIGS. 5A to 5C are graphs illustrating three conceivable patterns of characteristics of change of a moment M which acts on the steering shaft link 13 in response to a turn angle δ from the neutral position of the steering shaft link 13 in the state where the second electromagnet 36 is not energized. The turn angle δ and the moment M are each zero (origin) when the steering shaft link 13 is in the neutral position, and each may take a positive or negative value in accordance with which direction the steering shaft link 13 is turned.

FIG. 5A shows the case where the steering shaft link 13 starts turning from its neutral position when the magnitude (absolute value) of the moment M has exceeded m1, and the moment M changes linearly with respect to the turn angle δ other than zero. Such a characteristic can be obtained by setting the change in curvature near the dent in the heart-shaped cam face of the cam/brake disc 29 to be relatively moderate.

In this case, except the time when the steering shaft link 13 is turned for the purpose of self-sustaining control, the steering shaft link 13 is held in the neutral position by the second lock mechanism 28 and it is also locked to the vehicle body 3 by the first lock mechanism 27, so that the deviation from the neutral position thereof is prevented.

FIG. 5B shows the case where the steering shaft link 13 starts turning from its neutral position when the magnitude of the moment M has exceeded m2 which is larger than m1. Such a characteristic can be obtained by setting the change in curvature near the dent in the heart-shaped cam face of the cam/brake disc 29 to be relatively steep. In this case, during normal traveling in which no self-sustaining control is performed, the steering shaft link 13 is reliably locked in the neutral position with the second lock mechanism 28 alone, although it is also locked by the first lock mechanism 27.

In the case where the second lock mechanism 28 has the characteristic as shown in FIG. 5B, the stiffness about the first steering shaft 17 caused by locking the steering shaft link 13 with the second lock mechanism 28 becomes greater than the stiffness caused by the torque at the time of driving the first motor 15. In this case, the stiffness about the first steering shaft 17 is higher when the steering shaft link 13 is locked with the second lock mechanism 28 alone and the generation of the torque by the first motor 15 is being stopped, than when the first motor 15 is being controlled to cause the steering shaft link 13 to turn.

It should be noted that the stiffness about the first steering axis 10 being high means that the displacement in the rotational direction of the first steering shaft 17 when a circumferential moment is externally applied to the first steering shaft 17 is small.

FIG. 5C shows the case where the moment M changes linearly with respect to the turn angle δ. In this case, the steering shaft link 13 turns from its neutral position even when the magnitude of the moment M is near zero. As the second lock mechanism 28 cannot hold the steering shaft link 13 in the neutral position, it is unable to fulfill its intended function.

In this case, the second lock mechanism 28 functions solely as a biasing means which urges the steering shaft link 13 toward the neutral position. To lock the steering shaft link 13 in the neutral position, the first lock mechanism 27 can be used.

Returning to FIGS. 2 and 3, the steering shaft link 13 is provided with a second motor 37 as a second actuator which causes the front-wheel support section 14 to turn about the second steering axis 11 relative to the steering shaft link 13, and a clutch mechanism 38 which switches between a transmission-enabled state in which the driving force of the second motor 37 is transmitted to the second steering shaft 21, and a transmission-interrupted state in which the transmission is interrupted.

The driving force of the second motor 37 is transmitted to the second steering shaft 21 via a second pinion 39 secured to the driving shaft of the second motor 37, a second gear 40 rotatably supported on the second steering shaft 21, and the clutch mechanism 38, in this order. The second motor 37 is driven in cooperation with the first motor 15, in the self-sustaining control, so as to apply more appropriate restoring force to the vehicle body 3.

This cooperation is preferably performed when the steered angle about the first steering axis 10 is large. That is, when the steering shaft link 13 is turned to a large extent from its neutral position, the front-wheel support section 14 can also be turned in the same direction, to thereby obtain larger restoring force.

The clutch mechanism 38 includes: a clutch plate 41 coaxially secured to the second gear 40, a clutch plate 42 coaxially secured to the second steering shaft 21, a second iron core 43 of a cylindrical shape which is coaxially guided along the second steering shaft 21, a third coil spring 44 which urges the second iron core 43 in the direction (transmission-interrupted direction) of separating the clutch plate 42 from the clutch plate 41, and a third electromagnet 45 which moves the second iron core 43 against the biasing force of the third coil spring 44.

The clutch mechanism 38 is switched to the transmission-enabled state in the self-sustaining control, so as to enable the turning of the front-wheel support section 14 by the second motor 37. During normal traveling in which no self-sustaining control is performed, the clutch mechanism 38 is switched to the transmission-interrupted state so as to prevent the turning of the front-wheel support section 14 from being hindered by the friction of the second motor 37.

The steering section 6 further includes a handlebar 46 provided to be turnable about a rotational axis which is fixedly positioned with respect to the vehicle body 3, and a handlebar link mechanism 47 (handlebar transmission mechanism) which links the handlebar 46 to the front-wheel support section 14. The handlebar link mechanism 47 transmits the manipulated variable of the handlebar 46 to the front-wheel support section 14 such that the steered angle of the front wheel 4 can be controlled by the manipulation of the handlebar 46.

The handlebar link mechanism 47 includes: a first lever 48 which turns about the rotational axis of the handlebar 46 in an integrated manner with the handlebar 46, a second lever 49 which turns about the second steering axis 11 to apply rotative force to the front-wheel support section 14 via the top bridge 23, and a first link 50 which connects the first lever 48 and the second lever 49. The rotational axis of the handlebar 46 is collinear with the first steering axis 10. The first link 50 is parallel to the steering shaft link 13.

A third motor 51 is interposed between the second lever 49 and the top bridge 23 for adjusting the angle formed by the second lever 49 and the front-wheel support section 14 about the second steering axis 11. The third motor 51 is equipped with a speed reducer for reducing its driving force and a brake for locking its driving shaft.

The third motor 51 is controlled such that a prescribed handlebar offset angle is added to a handlebar angle in the self-sustaining control. The "handlebar angle" refers to the turn angle of the handlebar 46 from its neutral position. The handlebar offset angle is added, for example, to decrease the change in handlebar angle to the change in turn angle (steering angle about the first steering axis 10) of the steering shaft link 13 from the neutral position.

Figure 6:
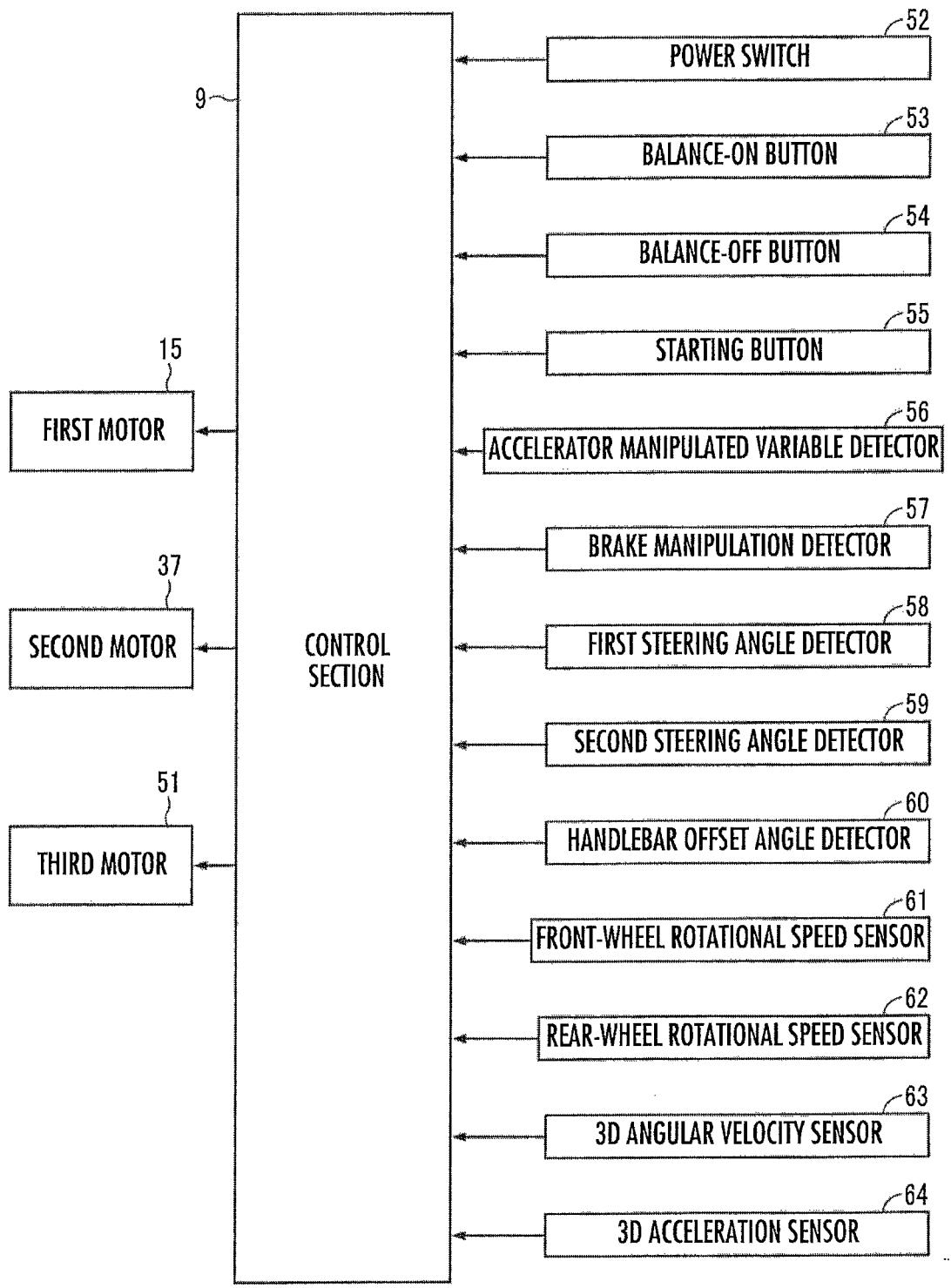
FIG. 6 is a block diagram showing operation means, sensors, and other components connected to the control section of the two-wheeled vehicle in FIG. 1.

FIG. 6 is a block diagram showing operation means, sensors, and other components which generate data or signals input to the control section 9. As shown in FIG. 6, the two-wheeled vehicle 1 includes, as operation switches and buttons, a power switch 52 for turning on the power to the two-wheeled vehicle 1, a balance-on button 53 and a balance-off button 54 for selecting an operating mode in the two-wheeled vehicle 1, and a starting button 55 for starting the power engine of the two-wheeled vehicle 1.

Further, the two-wheeled vehicle 1 includes, as various detectors, an accelerator manipulated variable detector 56 which detects an accelerator manipulated variable, a brake manipulation detector 57 which detects manipulation of the brake, a first steering angle detector (rotary encoder) 58 which detects a steering angle of the first steering shaft 17, a second steering angle detector (rotary encoder) 59 which detects a steering angle of the second steering shaft 21, and a handlebar offset angle detector 60 which detects a handlebar offset angle.

The two-wheeled vehicle 1 further includes, as various sensors, a front-wheel rotational speed sensor 61 which detects a rotational speed of the front wheel 4, a rear-wheel rotational speed sensor 62 which detects a rotational speed of the rear wheel 5, a 3D angular velocity sensor 63 which is capable of detecting angles and angular velocities about the three axes of the vehicle body 3, and a 3D acceleration sensor 64 which is capable of detecting accelerations in the three axial directions of the vehicle body 3.

The above-described posture detector 7 is configured with, for example, the 3D angular velocity sensor 63 and the 3D acceleration sensor 64. In this case, the control section 9 carries out arithmetic processing on the basis of the outputs from the 3D angular velocity sensor 63 and the 3D acceleration sensor 64, to measure an inclination angle in the roll direction of the vehicle body 3 with respect to the vertical direction. For this measurement, the technique proposed by the present applicant in Japanese Patent No. 4181113, for example, may be adopted.

The control section 9 is configured with a CPU, RAM, ROM, interface circuit, etc. The control section 9 controls the first motor 15, the second motor 37, and the third motor 51 on the basis of the information input from the operation switches and buttons, detectors, and sensors described above.

Figure 7A:
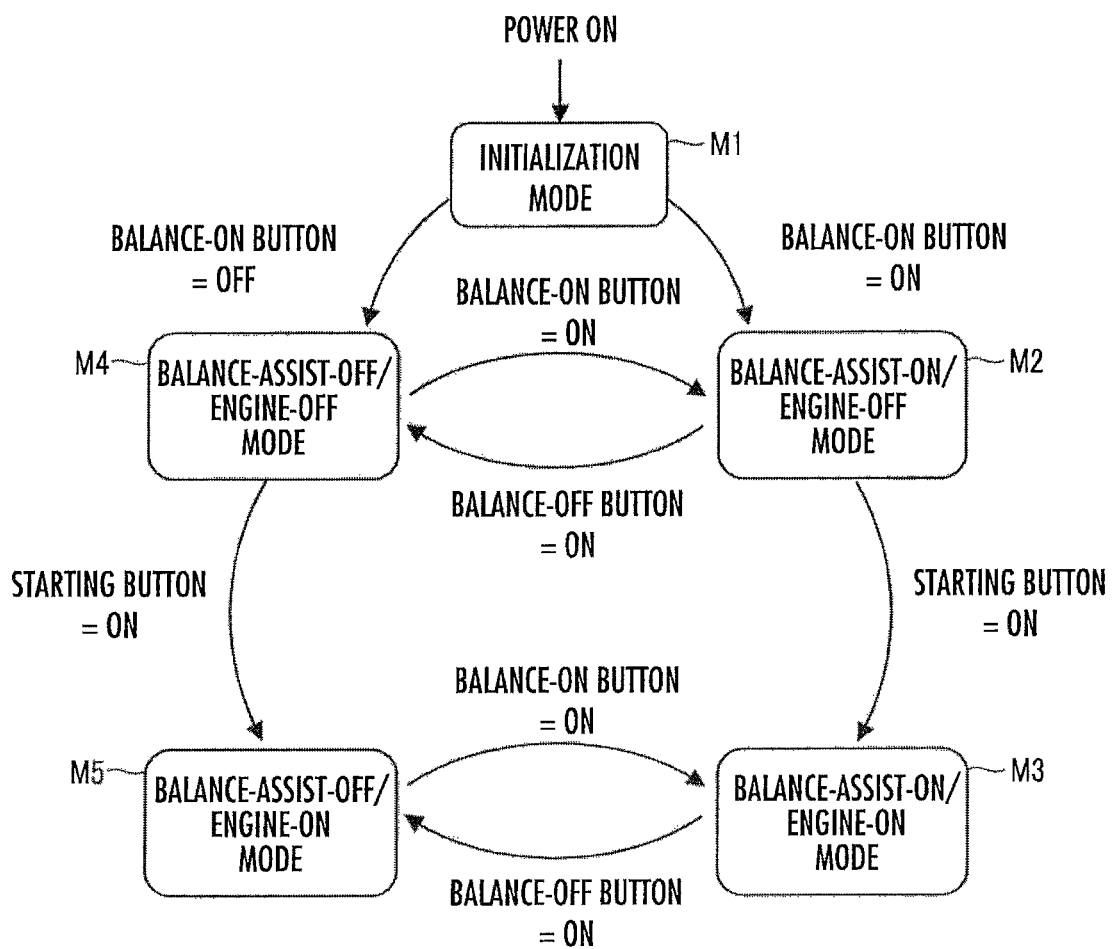
FIGS. 7A and 7B illustrate transitions between operating modes in the two-wheeled vehicle in FIG. 1.
Figure 7B:
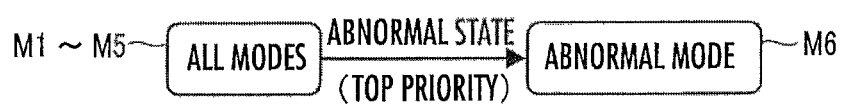

FIGS. 7A and 7B illustrate transitions between operating modes in the two-wheeled vehicle 1. When the two-wheeled vehicle 1 is standing while being supported by a kickstand, the first steering shaft 17 is in the state where it is locked in the neutral position by the second lock mechanism 28 or the position of the shaft is indefinite, and the second steering shaft 21 is in the state where it can rotate freely. Further, the above-described handlebar offset angle is fixed to zero or unfixed.

In this state, when the rider holds the handlebar 46 of the two-wheeled vehicle 1 with his/her hands and puts up the kickstand supporting the two-wheeled vehicle 1, then the two-wheeled vehicle 1 enters the state where the power can be turned on. In this state, when the power is turned on by manipulation of the power switch 52 (POWER ON), as shown in FIG. 7A, the control section 9 shifts to an initialization mode M1, in which it performs necessary initialization processing.

In the case where the rider has manipulated the power switch 52 while pressing the balance-on button 53, the mode shifts to a balance-assist-on/engine-off mode M2, in which the self-sustaining control by driving of the first motor 15, the second motor 37, and the third motor 51 is started. At this time, the front wheel 4 and the rear wheel 5 are in the state where they can rotate freely.

In the self-sustaining control, the locking of the first steering shaft 17 by the second lock mechanism 28 is released, and the clutch mechanism 38 is switched to the transmission-enabled state. The control section 9 carries out the self-sustaining control by driving the first motor 15, the second motor 37, and the third motor 51 so as to stabilize the posture of the vehicle body 3, on the basis of the outputs from the first steering angle detector 58, the second steering angle detector 59, the handlebar offset angle detector 60, the front-wheel rotational speed sensor 61, the rear-wheel rotational speed sensor 62, the 3D angular velocity sensor 63, the 3D acceleration sensor 64, etc.

In this self-sustaining control, the steering shaft link 13 is turned by the first motor 15, so that the front wheel 4 is steered about the first steering axis 10 having a negative trail t1. Further, the front-wheel support section 14 is turned by the second motor 37 in accordance with the turning angle of the steering shaft link 13, as explained above. Further, the control of adding the handlebar offset angle to the handlebar angle by the third motor 51 is performed. In this manner, the posture of the vehicle body 3 is maintained in a stable state.

In the balance-assist-on/engine-off mode M2, when the rider climbs on the two-wheeled vehicle 1 and presses the starting button 55, the two-wheeled vehicle 1 enters the state where the front wheel 4 or the rear wheel 5 can be driven by the power engine, and the mode shifts to a balance-assist-on/engine-on mode M3. In the balance-assist-on/engine-on mode M3, the self-sustaining control is continued by driving the first motor 15, the second motor 37, and the third motor 51.

In the balance-assist-on/engine-on mode M3, when the rider lifts his/her feet off the ground, releases the brake lever of the two-wheeled vehicle, and manipulates the accelerator, then the two-wheeled vehicle 1 starts traveling by the driving force of the power engine. Further, the manipulations of the brake lever and the accelerator are detected by the brake manipulation detector 57 and the accelerator manipulated variable detector 56.

In addition to the above events, when the control section 9 also detects that the speed of the two-wheeled vehicle 1 has increased to a prescribed level or higher, the control section 9 locks the first steering shaft 17 in the neutral position by the second lock mechanism 28, and stops the control of the first motor 15. The first steering shaft 17 is also locked by the first lock mechanism 27, so that the rotation of the first steering shaft 17 is prevented reliably. Further, the control section 9 switches the clutch mechanism 38 to the transmission-interrupted state, and stops the control of the second motor 37. Further, the handlebar offset angle is fixed to zero, and the control of the third motor 51 is stopped. Accordingly, the rider can drive the two-wheeled vehicle 1 with good self-steering properties.

In this state, when the speed of the two-wheeled vehicle 1 has decreased below the prescribed level, the locking of the first steering shaft 17 by the second lock mechanism 28 and the locking of the first steering shaft 17 by the first lock mechanism 27 are released, the clutch mechanism 38 is switched to the transmission-enabled state, and the above-described self-sustaining control including the control of the first motor 15 and the second motor 37 is resumed. The fixation of the handlebar offset angle is also released, and the control of the handlebar offset angle by the third motor 51 is resumed.

On the other hand, in the case where the rider has not pressed the balance-on button 53 while manipulating the power switch 52, the mode shifts through the initialization mode M1 to a balance-assist-off/engine-off mode M4.

In the balance-assist-off/engine-off mode M4, the first steering shaft 17 is locked in the neutral position by the second lock mechanism 28, and the control of the first motor 15 is stopped. The first steering shaft 17 is also locked by the first lock mechanism 27, so that the rotation of the first steering shaft 17 is prevented reliably. Further, the clutch mechanism 38 is switched to the transmission-interrupted state, and the control of the second motor 37 is stopped. Further, the handlebar offset angle is fixed to zero, and the control of the third motor 51 is stopped. The front wheel 4 and the rear wheel 5 are in the state where they can rotate freely.

In the balance-assist-off/engine-off mode M4, when the rider climbs on the two-wheeled vehicle 1 and presses the starting button 55, driving of the front wheel 4 and the rear wheel 5 is started, and the mode shifts to a balance-assist-off/engine-on mode M5. In the balance-assist-off/engine-on mode M5, the rider can drive the two-wheeled vehicle 1 with good self-steering properties, as in the case where the speed of the two-wheeled vehicle 1 is the prescribed speed or higher in the balance-assist-on/engine-on mode M3 described above.

On the other hand, when the balance-on button 53 is pressed in the balance-assist-off/engine-off mode M4, the mode shifts to the balance-assist-on/engine-off mode M2. When the balance-off button 54 is pressed in the balance-assist-on/engine-off mode M2, the mode shifts to the balance-assist-off/engine-off mode M4.

When the balance-on button 53 is pressed in the balance-assist-off/engine-on mode M5, the mode shifts to the balance-assist-on/engine-on mode M3. When the balance-off button 54 is pressed in the balance-assist-on/engine-on mode M3, the mode shifts to the balance-assist-off/engine-on mode M5.

Therefore, for example in the case where the rider wishes to travel in the balance-assist-on/engine-on mode M3, the rider may manipulate the power switch 52 without pressing the balance-on button to move through the initialization mode M1 to the balance-assist-off/engine-off mode M4, and the rider may press the balance-on button 53 only after the mode has shifted further to the balance-assist-off/engine-on mode M5.

It should be noted that in any of the modes M1 through M5, when an abnormal state has been detected, the control section 9 immediately shifts to a prescribed abnormal mode M6, as shown in FIG. 7B. Therefore, as long as no abnormal state is detected, depression of the balance-off button 54 or the balance-on button 53 is accepted normally. At this time, the depression of the balance-off button 54 is prioritized over the depression of the balance-on button 53.

Accordingly, for example even if the balance-on button 53 is pressed in the balance-assist-off/engine-on mode M5, the mode will not shift to the balance-assist-on/engine-on mode M3 if there is an abnormal state.

It should be noted that the abnormal state means the state where the control section 9 is unable to continue normal control operations. More specifically, the abnormal state may be, for example, the state where a trouble has been detected in any of the sensors such as the 3D angular velocity sensor 63, the actuators such as the first motor 15, the mechanisms such as the clutch mechanism 38, or other control or electrical systems, the state where it has been determined that the inclination angle of the vehicle body 3 is too large, or the state where a prescribed time or more has passed since the operating angle of the first motor 15 or other actuator exceeded a permissible limit.

In the abnormal mode M6, the first steering shaft 17 is locked by the first lock mechanism 27, and the control of the first motor 15 is stopped. The clutch mechanism 38 is switched to the transmission-interrupted state, and the control of the second motor 37 is stopped. Further, the handlebar offset angle is fixed, and the control of the third motor 51 is stopped. Therefore, the first steering shaft 17 may not be in the neutral position. The handlebar offset angle may not be zero. The driving of the front wheel 4 is stopped, and the front wheel 4 attains the state where it can rotate freely. If the rear wheel 5 has been driven until then, the driving thereof is continued.

According to the present embodiment, the caster angle θ based on the first steering axis 10 is positive or 0, the trail t2 based on the second steering axis 11 is positive, and the point of intersection of the second steering axis 11 and the ground surface 12 lies in front of the point of intersection of the first steering axis 10 and the ground surface 12. When the vehicle speed is lower than a prescribed level, self-sustaining control is performed by causing the steering shaft link 13 to turn about the first steering shaft 17 having a negative trail t1. This ensures effective self-sustaining control.

When the vehicle speed is higher than a prescribed level, the first steering shaft 17 having a negative trail t1 is locked in the neutral position, and the front wheel 4 is led with the large trail t2 based on the second steering shaft 21, so that the two-wheeled vehicle 1 can be driven with good self-steering effects. That is, at the time of self-sustaining control and at the time of normal traveling without the self-sustaining control, the steering can be carried out with the trails suitable for the respective situations.

The second motor 37 is also provided which causes the front-wheel support section 14 to turn about the second steering axis 11 relative to the steering shaft link 13. Controlling the second motor 37 in cooperation with the first motor 15 enables more effective self-sustaining control.

At the time of normal traveling with no self-sustaining control, the power transmission between the second motor 37 and the second steering shaft 21 is interrupted. This can prevent the turning of the front-wheel support section 14 from being hindered by the second motor 37. Accordingly, during the normal traveling, the rider can obtain good maneuvering feeling, while the self-steering function works with no problem. It should be noted that in the case where the effect of the friction in the second motor 37 on the rotation of the second steering shaft 21 is sufficiently small, the clutch mechanism 38 may be omitted and the second gear 40 may be secured to the second steering shaft 21.

The first lock mechanism 27 is also provided which locks the position of the steering shaft link 13 relative to the vehicle body 3. Therefore, during normal traveling with no self-sustaining control, the steering shaft link 13, which has been locked in the neutral position by the second lock mechanism 28, can be locked to the vehicle body 3 more reliably. Further, at this time, compared to the case where the steering shaft link 13 is locked by the torque of the first motor 15 via the first pinion 25 and the first gear 26, the steering shaft link 13 can be locked reliably, without causing rattling. When there is an abnormality, the first lock mechanism 27 can lock the steering shaft link 13 at the angle immediately before the occurrence of the abnormality.

Further, the steering shaft link 13 is locked in the neutral position by the second lock mechanism 28, without the need of the torque of the first motor 15. The stiffness about the first steering shaft 17 becomes higher in the case where the steering shaft link 13 is locked by the second lock mechanism 28 and generation of the torque of the first motor 15 is stopped, than in the case where the first motor 15 is controlled while the locking by the second lock mechanism 28 is released. It is thus possible to lock the steering shaft link 13 to the vehicle body 3 reliably, without rattling, by the second lock mechanism 28.

The first steering shaft 17 and the second steering shaft 21 are parallel to each other. This can prevent the direction of the second steering shaft 21 from being changed when the steering shaft link 13 is turned about the first steering shaft 17.

Further, for the same reason, it is readily possible to form the steering shaft link 13, which links the first steering shaft 17 with the second steering shaft 21, and the handlebar link mechanism 47, which links the handlebar 46 with the front-wheel support section 14.

The handlebar link mechanism 47 is configured with the first lever 48, the second lever 49, and the first link 50 described above. Accordingly, it is readily possible to form the handlebar link mechanism 47 while making the rotational axis of the handlebar 46 agree with the first steering axis 10.

Figure 8:
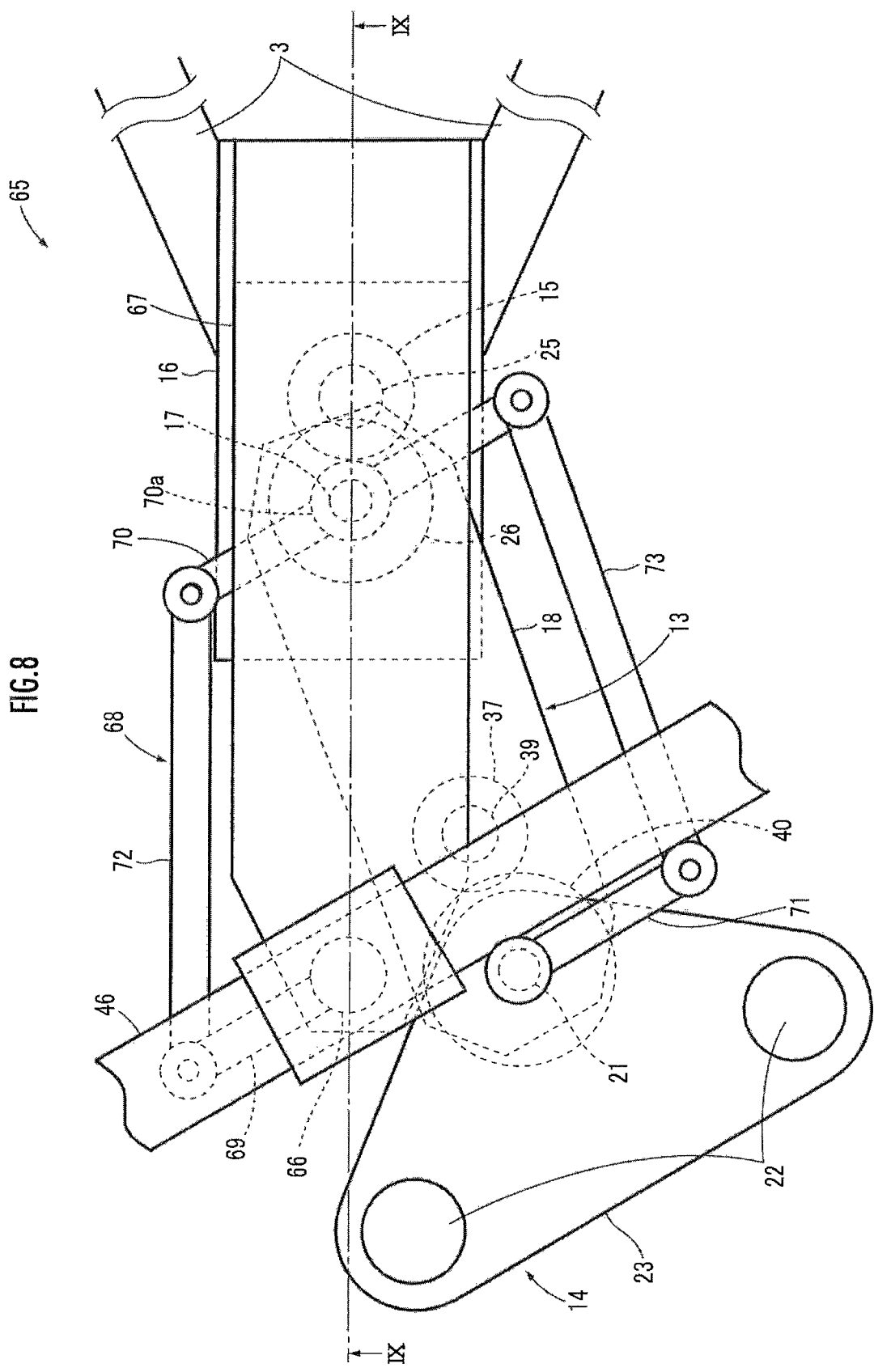
FIG. 8 is a plan view showing another example of the steering section in the two-wheeled vehicle in FIG. 1.
Figure 9:
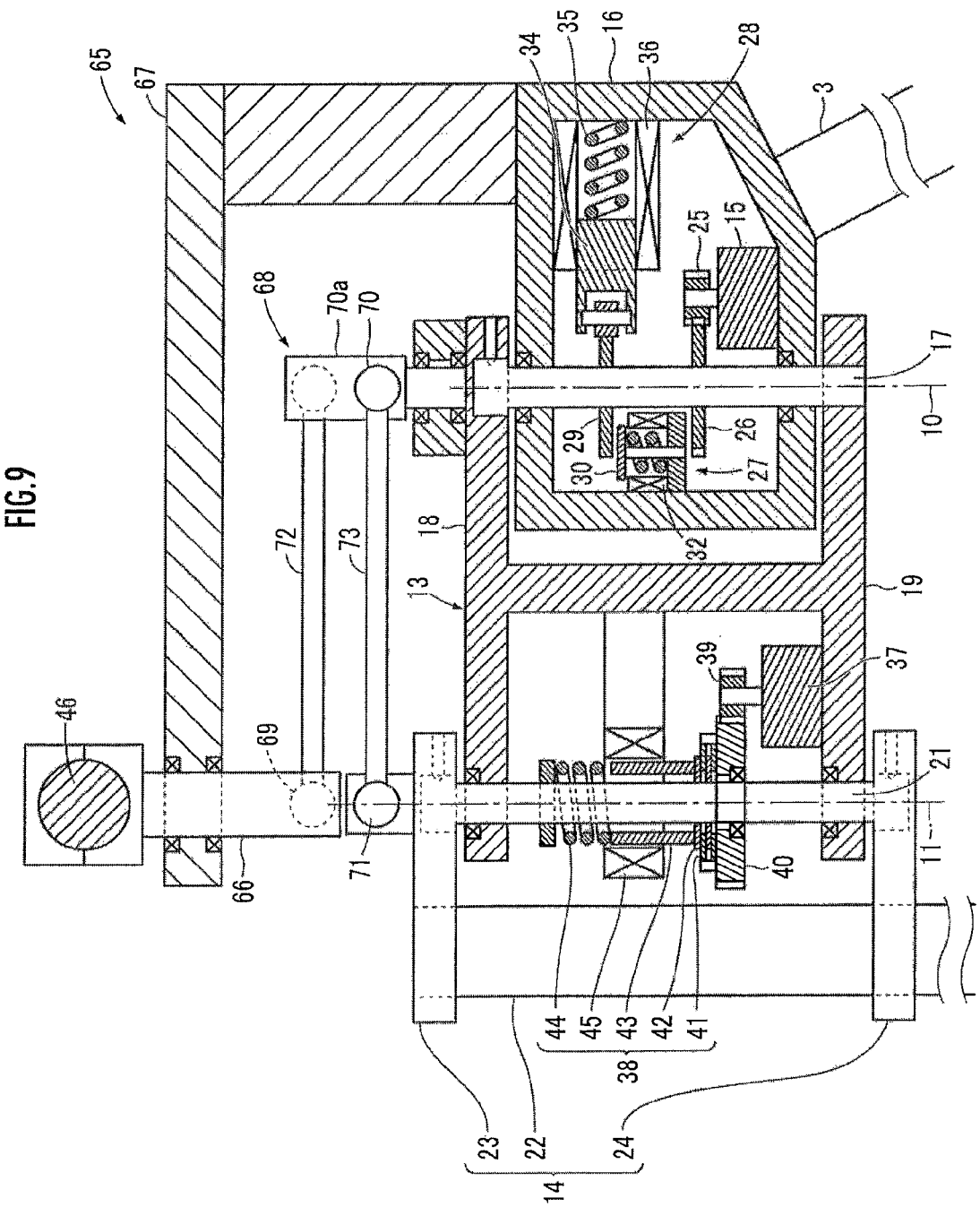
FIG. 9 is a partial cross-sectional view taken along the line IX-IX in FIG. 8, when the vehicle is in the basic posture state.

FIG. 8 is a plan view showing another example of the steering section. FIG. 9 is a partial cross-sectional view taken along the line IX-IX in FIG. 8, when the vehicle 1 is in the basic posture state. FIG. 8 shows the steering section 65 in the state where the steering shaft link 13 has been turned to the left. FIG. 9 shows the steering section 65 in the state where the two-wheeled vehicle 1 is in the basic posture state.

In the steering section 65, the handlebar 46 has its turning shaft 66 turnably supported by the vehicle body 3 via the housing 16 and a handlebar support section 67. When the two-wheeled vehicle 1 is in the basic posture state, the turning shaft 66 of the handlebar 46 is collinear with the second steering shaft 21, although the turning shaft 66 may be displaced from this position in the longitudinal direction. It should be noted that the turning shaft 66 of the handlebar 46 may be turnably supported by the steering shaft link 13.

The steering section 65 has a handlebar link mechanism 68 which includes: a third lever 69 which turns in an integrated manner with the handlebar 46, a fourth lever 70 which has a middle portion 70a turnably supported by the vehicle body 3 via the housing 16 and the steering shaft link 13, a fifth lever 71 which turns about the second steering shaft 21 in an integrated manner with the front-wheel support section 14, a third link 72 which connects the third lever 69 with one end of the fourth lever 70, and a fourth link 73 which connects the other end of the fourth lever 70 with the fifth lever 71.

The turning shaft of the fourth lever 70 is turnably supported by the steering shaft link 13, on the same straight line as the first steering shaft 17. An actuator for applying a handlebar offset angle, like the third motor 51 in the handlebar link mechanism 47 shown in FIGS. 2 and 3, is not provided, although such an actuator may be provided. The fourth lever 70 may be configured such that its middle portion 70a is turnably supported by the steering shaft link 13. For the rest, the steering section 65 is identical to the steering section 6 in FIGS. 2 and 3.

According to the handlebar link mechanism 68 of the steering section 65, it is possible to steer, with the handlebar 46, the front wheel 4 on the front-wheel support section 14, which is turned about the second steering axis 11 relative to the vehicle body 3, while positioning the rotational axis of the handlebar 46 near the second steering axis 11.

Further, when the handlebar link mechanism 68 is formed such that the third lever 69 is parallel to the fourth lever 70 and the fifth lever 71 is parallel to the fourth lever 70, as shown in FIG. 8, the handlebar angle of the handlebar 46 and the steering angle of the front wheel 4 can be made to agree with each other.

Figure 10:
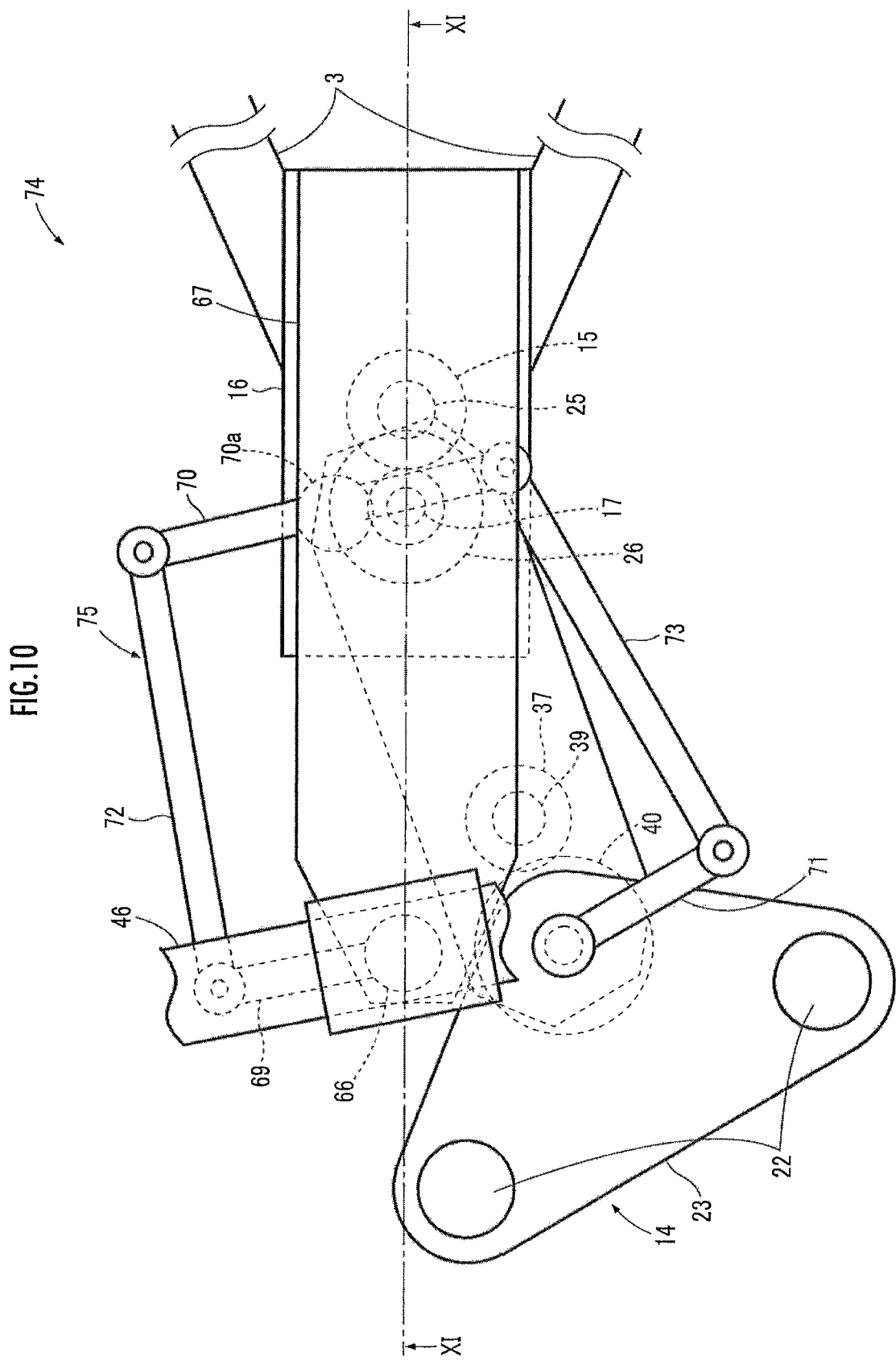
FIG. 10 is a plan view showing yet another example of the steering section in the two-wheeled vehicle in FIG. 1.
Figure 11:
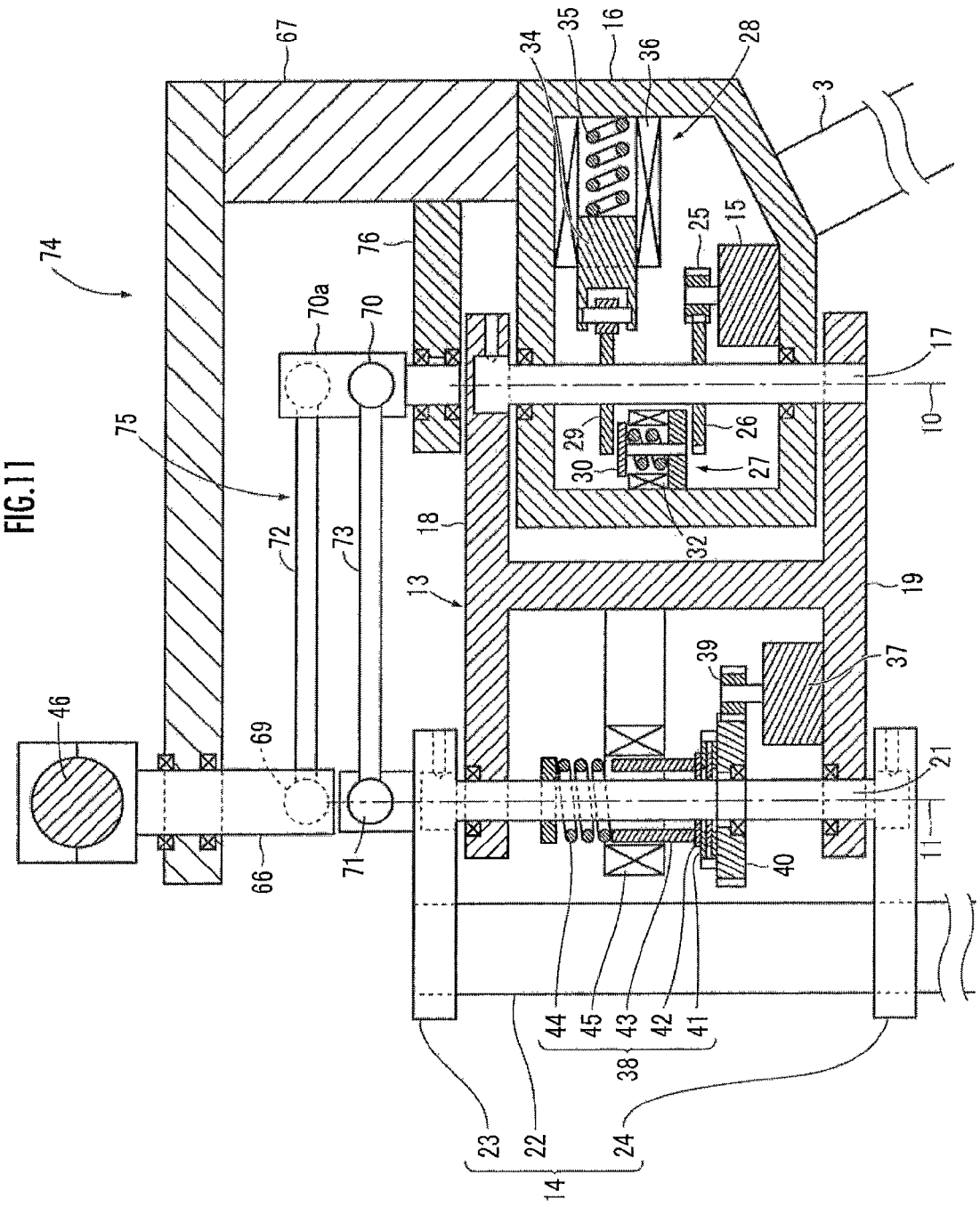
FIG. 11 is a partial cross-sectional view taken along the line XI-XI in FIG. 10, when the vehicle is in the basic posture state.

FIG. 10 is a plan view showing yet another example of the steering section. FIG. 11 is a partial cross-sectional view taken along the line XI-XI in FIG. 10, when the vehicle 1 is in the basic posture state. FIG. 10 shows the steering section 74 in the state where the steering shaft link 13 has been turned to the left. FIG. 11 shows the steering section 74 in the state where the two-wheeled vehicle 1 is in the basic posture state.

The steering section 74 has a handlebar link mechanism 75 in which the turning shaft supporting a middle portion 70a of a fourth lever 70 is positioned at a prescribed distance to the right of the first steering shaft 17, so as to be parallel to the first steering axis 10. The turning shaft is supported by the vehicle body 3 via the housing 16, a handlebar support section 67, and a lever support section 76. Otherwise, the steering section 74 has a structure similar to that of the steering section 65 shown in FIG. 9. It should be noted that the turning shaft (middle portion 70a) of the fourth lever 70 may be supported by the steering shaft link 13.

According to the steering section 74, the ratio of the amount of change in handlebar angle of the handlebar 46 to the amount of change in turning angle of the steering shaft link 13 about the first steering axis 10 can be set by selecting a distance from the first steering shaft 17 to the turning shaft (middle portion 70a) of the fourth lever 70. Specifically, in the case of the steering section 74 shown in FIG. 10, the amount of change in handlebar angle to the amount of change in turning angle of the steering shaft link 13 becomes ½.

It should be noted that the present invention is not limited to the above-described embodiment. For example, the second motor 37 may be replaced with a braking force generating section 77 (see FIG. 3) which generates braking force for suppressing the turning of the front-wheel support section 14 about the second steering axis 11 relative to the steering shaft link 13. For the braking force generating section 77, one that utilizes a damper effect by the viscosity of a magnetic fluid, for example, may be used.

With this configuration, when the steering shaft link 13 is turned about the first steering shaft 17, the turning of the front-wheel support section 14 about the second steering shaft 21 can be braked with the braking force generating section 77 via the second pinion 39 and the second gear 40, to suppress the turning of the front-wheel support section 14 in the direction opposite to the turning direction of the steering shaft link 13. It is thus possible to suppress the decrease of the restoring force applied to the vehicle body 3 by the turning of the steering shaft link 13 due to the turning of the front-wheel support section 14.

Further, the clutch mechanism 38 and the second motor 37 may be replaced with a third lock mechanism which switches between a locked state in which the front-wheel support section 14 is locked to the steering shaft link 13 and an unlocked state in which the locked state is released. The third lock mechanism may have a structure similar to that of the first lock mechanism 27, for example.

Figure 12:
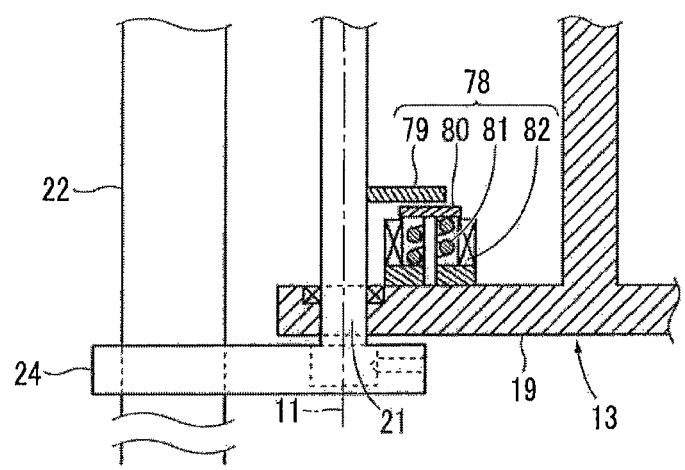
FIG. 12 is a partial cross-sectional view showing a third lock mechanism which can be adopted in place of the clutch mechanism and the second motor in the two-wheeled vehicle in FIG. 1.

Specifically, as shown in FIG. 12, the third lock mechanism 78 may include: a brake disc 79 which is secured perpendicularly to the second steering shaft 21, a brake pad 80 which is supported so as to be movable between an engaged position in which it is engaged with the brake disc 79 and a disengaged position in which the engagement is released, a fourth coil spring 81 which urges the brake pad 80 toward the disengaged position, and a fourth electromagnet 82 which pulls the brake pad 80 back to the engaged position against the biasing force of the fourth coil spring 81.

When the fourth electromagnet 82 is not energized, the third lock mechanism 78 is in the unlocked state in which the brake pad 80 is positioned in the disengaged position by the fourth coil spring 81. When the fourth electromagnet 82 is energized, the third lock mechanism 78 attains the locked state in which the brake pad 80 is pulled back to the engaged position against the biasing force of the fourth coil spring 81.

With this configuration, when the steering shaft link 13 is turned about the first steering shaft 17, the front-wheel support section 14 can be locked to the steering shaft link 13 by the third lock mechanism 78 to prevent the front-wheel support section 14 from turning in the direction opposite to the turning direction of the steering shaft link 13. Accordingly, it is possible to prevent the restoring force applied to the vehicle body 3 by the turning of the steering shaft link 13 from being decreased by the turning of the front-wheel support section 14.

Further, the second lock mechanism 28 may be replaced with a coil spring, rotational spring, leaf spring or the like as a biasing means which urges the steering shaft link 13 toward the neutral position. Alternatively, the second lock mechanism 28 may be replaced with a mechanism in which a disc is secured to the first steering shaft 17, a notch or slot is provided on the circumference of the disc, and a pin being urged by a spring or the like supported by the housing 16 is fitted into the notch or slot to thereby position the steering shaft link 13 in the neutral position.

The first pinion 25 and the first gear 26, or the second pinion 39 and the second gear 40 may be replaced with a torque transmission mechanism or a speed reduction mechanism using belt and pulleys, link mechanism, cam mechanism, or the like.

Further, the first steering shaft 17 or the second steering shaft 21 may be provided with a means which prevents the shaft from rotating to an abnormal angle. The handlebar 46 may be directly secured to the top bridge 23, without the intermediary of the handlebar link mechanism 47.

The third link 72 connecting the third lever 69 with the fourth lever 70 and the fourth link 73 connecting the fourth lever 70 with the fifth lever 71 may be arranged on the same side, instead of being arranged on the opposite (right and left) sides.

The handlebar link mechanism 47, 68, or 75 may be replaced with a transmission mechanism including gears, belt and pulleys, or the like, as a handlebar transmission mechanism.

For the actuator, instead of the electric motor, a hydraulic actuator or the like may be used.

What is claimed is:

1. A mobile vehicle including a vehicle body having a seat, a front wheel and a rear wheel arranged spaced apart from each other in a longitudinal direction of the vehicle body, and a steering section configured to cause the front wheel to turn about a steering axis, wherein
    the steering axis includes a first steering axis and a second steering axis,
    the first steering axis is arranged at a front of the vehicle body, and
    the steering section includes:
        a steering shaft link which is provided to be turnable about the first steering axis and which has the second steering axis arranged therein;
        a front-wheel support section which is provided to be turnable about the second steering axis and which supports the front wheel;
        a first actuator which causes the steering shaft link to turn about the first steering axis relative to the vehicle body;
        a posture detector which detects a posture state in a roll direction of the vehicle body; and
        a control section which controls the first actuator on the basis of the detection result by the posture detector, and wherein
    a caster angle based on the first steering axis is positive or 0,
    a trail based on the second steering axis is positive, and
    when the mobile vehicle is in a basic posture state on a flat ground surface, a point of intersection of the second steering axis and the ground surface lies in front of a point of intersection of the first steering axis and the ground surface.

2. The mobile vehicle according to claim 1, wherein the control section causes the first actuator to make the steering shaft link turn about the first steering axis having a trail smaller than the trail of the second steering axis, on the basis of the posture state in the roll direction of the vehicle body, to thereby carry out self-sustaining control of stabilizing the posture of the vehicle body by applying restoring force to the vehicle body.

3. The mobile vehicle according to claim 1, wherein the steering section further includes a second actuator which causes the front-wheel support section to turn about the second steering axis relative to the steering shaft link.

4. The mobile vehicle according to claim 1, wherein the steering section further includes a braking force generating section which generates braking force for suppressing the turning of the front-wheel support section about the second steering axis relative to the steering shaft link.

5. The mobile vehicle according to claim 1, wherein the steering section further includes a lock mechanism which switches between a locked state in which the front-wheel support section is locked to the steering shaft link and an unlocked state in which the locked state is released.

6. The mobile vehicle according to claim 3, wherein the steering section further includes a clutch mechanism which switches between a transmission-enabled state in which driving force of the second actuator is transmitted to the front-wheel support section and a transmission-interrupted state in which the transmission is interrupted.

7. The mobile vehicle according to claim 1, wherein the steering section further includes a first lock mechanism which switches between a locked state in which the steering shaft link is locked to the vehicle body and an unlocked state in which the locking is released.

8. The mobile vehicle according to claim 1, wherein the steering section further includes a second lock mechanism which switches between a locked state in which the steering shaft link is locked to the vehicle body while the link is in a neutral position and an unlocked state in which the locking is released.

9. The mobile vehicle according to claim 1, wherein the steering section further includes a biasing section which urges the steering shaft link toward a neutral position thereof.

10. The mobile vehicle according to claim 1, wherein the first steering axis and the second steering axis are parallel to each other.

11. The mobile vehicle according to claim 1, wherein the steering section further includes a handlebar which is provided to be turnable about a rotational axis whose position with respect to the vehicle body is fixed, and
a handlebar transmission mechanism which links the handlebar to the front-wheel support section so as to allow the front wheel to be steered by manipulation of the handlebar.

12. The mobile vehicle according to claim 11, wherein the handlebar transmission mechanism includes
    a first lever which turns about the rotational axis of the handlebar in an integrated manner with the handlebar,
    a second lever which turns about the second steering axis and applies rotative force to the front-wheel support section, and
    a first link which connects the first lever with the second lever, and wherein
the rotational axis of the handlebar is collinear with the first steering axis.

13. The mobile vehicle according to claim 11, wherein the handlebar transmission mechanism includes
    a third lever which turns in an integrated manner with the handlebar,
    a fourth lever which is turnably supported by the vehicle body or the steering shaft link,
    a fifth lever which turns about the second steering axis in an integrated manner with the front-wheel support section,
    a third link which connects the third lever with the fourth lever, and
    a fourth link which connects the fourth lever with the fifth lever, and wherein
the fourth lever has a rotational axis collinear with the first steering axis.

14. The mobile vehicle according to claim 11, wherein the handlebar transmission mechanism includes
    a third lever which turns in an integrated manner with the handlebar,
    a fourth lever which is turnably supported by the vehicle body or the steering shaft link,
    a fifth lever which turns about the second steering axis in an integrated manner with the front-wheel support section,
    a third link which connects the third lever with the fourth lever, and
    a fourth link which connects the fourth lever with the fifth lever, and wherein
the fourth lever has a rotational axis arranged in parallel with the first steering axis, at a prescribed distance from the first steering axis.

* * * * *